United States Patent
Sugiura et al.

(10) Patent No.: US 10,086,776 B2
(45) Date of Patent: Oct. 2, 2018

(54) VEHICLE EXTERIOR DECORATING MEMBER AND METHOD FOR MANUFACTURING THE SAME

(71) Applicant: TOYODA GOSEI CO., LTD., Kiyosu-shi, Aichi-ken (JP)

(72) Inventors: Tatsuya Sugiura, Kiyosu (JP); Tatsuya Oba, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 61 days.

(21) Appl. No.: 15/292,197

(22) Filed: Oct. 13, 2016

(65) Prior Publication Data
US 2017/0113628 A1   Apr. 27, 2017

(30) Foreign Application Priority Data

Oct. 21, 2015 (JP) .................................. 2015-206903
Aug. 30, 2016 (JP) .................................. 2016-167589

(51) Int. Cl.
*B60R 13/00* (2006.01)
*B32B 3/26* (2006.01)
(Continued)

(52) U.S. Cl.
CPC ........ *B60R 13/005* (2013.01); *B29C 45/0046* (2013.01); *B32B 3/263* (2013.01); *B32B 27/08* (2013.01); *B60R 19/52* (2013.01); *B29C 2045/0049* (2013.01); *B29K 2995/002* (2013.01); *B29K 2995/003* (2013.01); *B29K 2995/0025* (2013.01); *B29K 2995/0029* (2013.01); *B29L 2031/3005* (2013.01); *B32B 2307/402* (2013.01); *B32B 2307/41* (2013.01); *B32B 2307/414* (2013.01);
(Continued)

(58) Field of Classification Search
None
See application file for complete search history.

(56) References Cited

FOREIGN PATENT DOCUMENTS

| JP | 2002-240189 A | 8/2002 |
|---|---|---|
| JP | 2013-112179 A | 6/2013 |

*Primary Examiner* — Adam Krupicka
(74) *Attorney, Agent, or Firm* — Posz Law Group, PLC

(57) ABSTRACT

To provide a vehicle exterior decorating member capable of providing a sufficient gradation effect to an observer, and having enhanced design characteristics, and to provide a method for manufacturing the same.

A vehicle exterior decorating member includes a base member made of a colored translucent body having a front surface and a back surface including a surface having unevenness, and a light non-transmissive layer formed on a back surface side of the base member. The base member includes a general portion where a thickness is constant at greater than or equal to 2.5 mm and smaller than or equal to 4.0 mm, and a gradually changing portion where a thickness gradually changes. The gradually changing portion includes a maximum deviation portion where a difference in thickness between the general portion and the gradually changing portion becomes a maximum, and has (A) and/or (B). (A) Difference between a visible light transmissivity at the maximum deviation portion and a visible light transmissivity at the general portion is greater than or equal to 5%. (B) Assuming an L value of a Lab color system defined in JIS Z 8729, a difference between an L value at the maximum deviation portion and an L value at the general portion is greater than or equal to two.

11 Claims, 7 Drawing Sheets

(51) Int. Cl.
   *B32B 27/08*    (2006.01)
   *B29C 45/00*    (2006.01)
   *B60R 19/52*    (2006.01)
   *B29L 31/30*    (2006.01)
(52) U.S. Cl.
   CPC ..... *B32B 2307/416* (2013.01); *B32B 2605/00* (2013.01); *B60R 2019/525* (2013.01)

VEHICLE EXTERIOR DECORATING MEMBER AND METHOD FOR MANUFACTURING THE SAME

BACKGROUND

1. Technical Field

The present invention relates to a decorating member applied to an exterior body such as a body of a vehicle, and to a method for manufacturing the same.

2. Related Art

Various exterior decorating members for a vehicle represented by a front grill, a back garnish, and the like are conventionally known. Examples of such exterior decorating members for a vehicle include a decorating member obtained by integrating a transparent resin base member and a design body, where the transparent resin base member has, on its back surface, unevenness which exhibits the raised design body.

For example, an exterior decorating member described in Japanese Unexamined Patent Publication No. 2013-112179 includes a housing whose front surface serves as a design portion, and a transparent resin base member assembled with the housing on a front side of the vehicle. The transparent resin base member has a back surface facing the front surface of the housing and having a protrusion projecting out toward the housing. The light that has entered the transparent resin base member is refracted by the protrusion disposed on the back surface of the transparent resin base member, thus creating a protrusion-shaped shade on the front surface of the housing. Thus, the exterior decorating member of Japanese Unexamined Patent Publication No. 2013-112179 provides, to an observer, an appearance having a uniform gradation effect, thereby enhancing design characteristics of the vehicle exterior body.

However, the exterior decorating member described in Japanese Unexamined Patent Publication No. 2013-112179 does not provide a sufficient gradation effect to the observer.

SUMMARY

In light of the foregoing, an object of the present invention is to provide a vehicle exterior decorating member capable of providing a sufficient gradation effect to an observer, and having enhanced design characteristics, and to provide a method for manufacturing the same.

In order to achieve the object, the present invention provides a vehicle exterior decorating member including: a base member made of a colored translucent body having a front surface facing an exterior of a vehicle and a back surface facing the front surface back to back and including a surface having unevenness; and a light non-transmissive layer formed on a back surface side of the base member. The base member includes a general portion where a thickness is constant at greater than or equal to 2.5 mm and smaller than or equal to 4.0 mm, and a gradually changing portion where a thickness gradually changes. The gradually changing portion includes a maximum deviation portion where a difference in thickness between the general portion and the gradually changing portion becomes a maximum, and has at least one of following features (A) and (B).

(A) Difference between a visible light transmissivity at the maximum deviation portion and a visible light transmissivity at the general portion is greater than or equal to 5%.

(B) Assuming an L value of a Lab color system defined in JIS Z 8729, a difference between an L value at the maximum deviation portion and an L value at the general portion is greater than or equal to two.

In the vehicle exterior decorating member of the present invention adopting the configuration described above, the base member made of a colored translucent body includes the general portion where the thickness is constant, and the gradually changing portion where the thickness gradually changes. Furthermore, the back surface of the base member includes a surface having unevenness, and the light non-transmissive layer is formed on the back surface side of the base member. The gradually changing portion of the base member includes a maximum deviation portion where a difference in thickness between the general portion and the gradually changing portion becomes a maximum, where a relationship between the maximum deviation portion and the general portion satisfies at least one of the conditions: (A) a difference between a visible light transmissivity at the maximum deviation portion and a visible light transmissivity at the general portion is greater than or equal to 5%; and (B) assuming an L value of the Lab color system defined in JIS Z 8729, the difference between the L value at the maximum deviation portion and the L value at the general portion is greater than or equal to two.

The vehicle exterior decorating member of the present invention including the gradually changing portion that satisfies such conditions can provide a sufficient gradation effect to the observer compared to the conventional exterior decorating member. Therefore, the vehicle exterior decorating member of the present invention is advantageous in enhancing the design characteristics of the entire vehicle.

DETAILED DESCRIPTION

Figure 1:
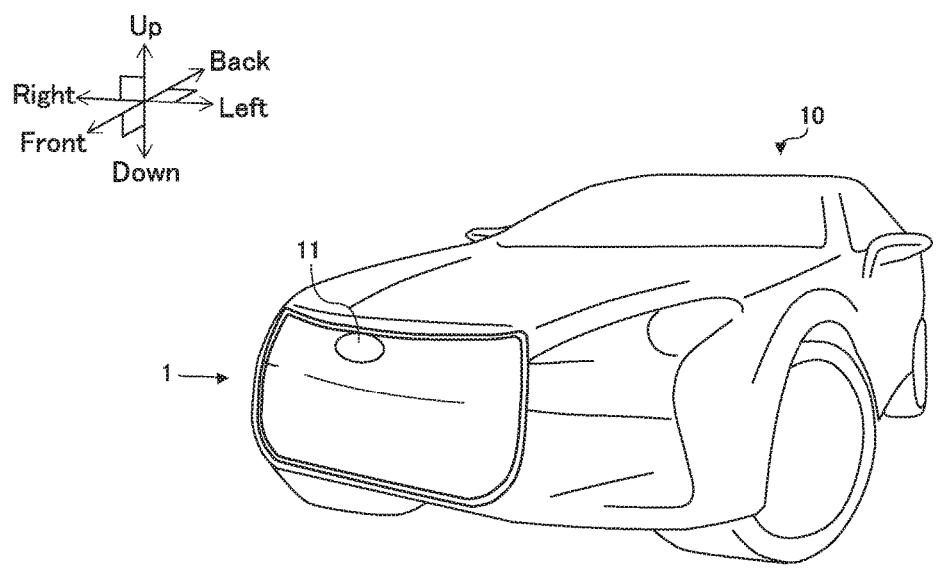
FIG. 1 is a view schematically showing a vehicle to which a vehicle exterior decorating member according to the present invention is applied.

Hereinafter, preferred embodiments of a vehicle exterior decorating member of the present invention will be described with reference to FIGS. 1 to 12. In FIGS. 1 to 4, and FIGS. 6 to 12, right, left, up, down, front, and back indicate directions seen by a vehicle passenger in a travel direction of a vehicle. The directions used in the specification all refer to the respective directions. Furthermore, the term "plate thickness direction" in the specification means a front and back direction shown in the figure. Moreover, the term "plate thickness" means the thickness of the base member in the front and back direction.

Drawings used for the explanation are schematic views, and the shape, the relative position relationship, the size relationship, and the like at minute portions are not necessarily shown precisely. For the purpose of facilitating the explanation in the following description, the same reference numerals or related reference numerals are sometimes denoted on the same members and the members that demonstrate similar operation effects among different embodiments, but this does not intend to unnecessarily limit the relationship among the members.

Matters other than matters particularly mentioned in the present invention, which matters being necessary for implementing the present invention, can be understood as design matters of those skilled in the art based on the conventional art in the relevant field. The present invention can be implemented based on the content disclosed in the present specification and the technical knowledge in the relevant field.

First Embodiment

Figure 2:
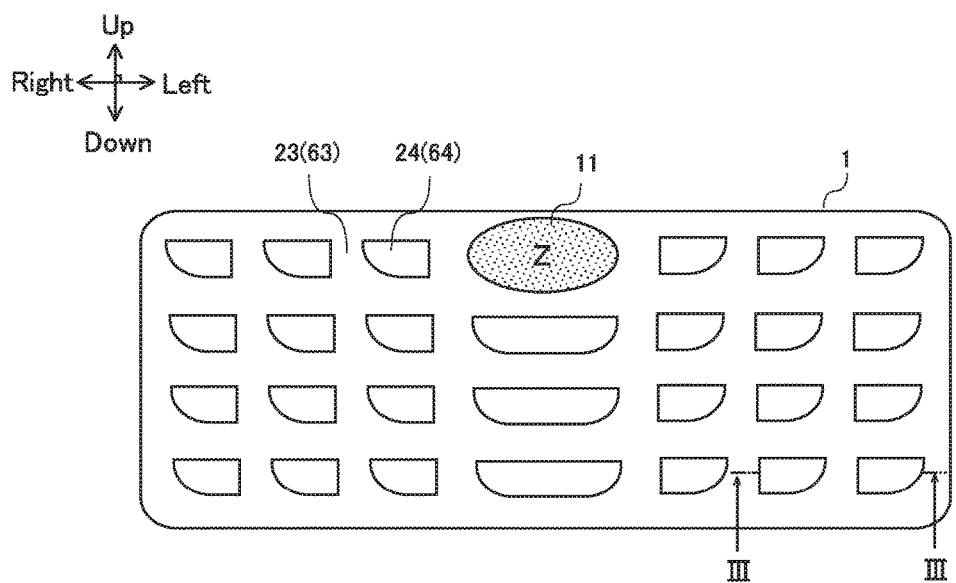
FIG. 2 is a front view schematically showing a vehicle exterior decorating member according to a first embodiment and a second embodiment.

A vehicle exterior decorating member 1 according to a first embodiment is a front grill that coves at least a part of a wind introducing opening formed in a body of a front face of a vehicle 10 as shown in FIGS. 1 and 2. The vehicle exterior decorating member 1 in the first embodiment desirably has a length of greater than or equal to 500 mm in a left and right direction of the vehicle, which is a longitudinal direction of the vehicle exterior decorating member 1, and can be applied as a large shape of approximately 1500 mm. In the vehicle exterior decorating member 1 of the first embodiment, an emblem 11 is disposed at a central part in the left and right direction and at an upper part in an up and down direction.

Figure 3:
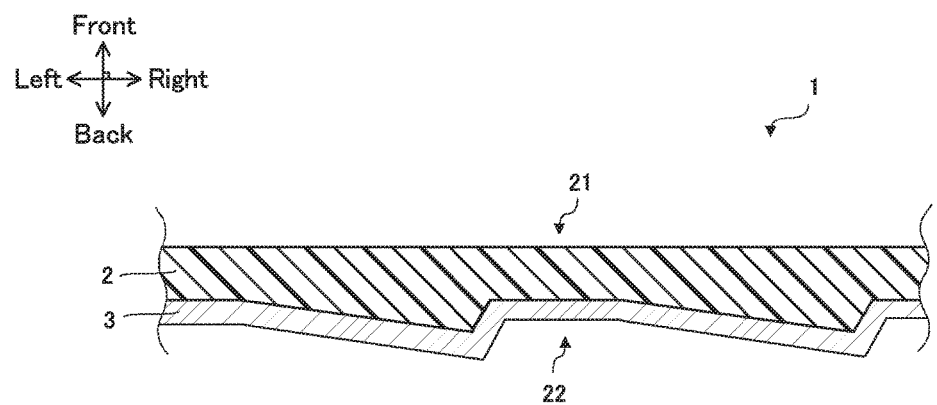
FIG. 3 is a cross-sectional view, taken along line III-III in FIG. 2, of the vehicle exterior decorating member according to the first embodiment.

As shown in FIG. 3, the vehicle exterior decorating member 1 includes a base member 2 made of a colored translucent body, and a light non-transmissive layer 3 formed on a back surface 22 side of the base member 2.

The light non-transmissive layer 3 is a member where the light passing through the base member 2 made of a colored translucent body is reflected or where the transmitted light is absorbed. As shown in FIG. 3, the light non-transmissive layer 3 is integrally formed on the back surface 22 of the base member 2. In the first embodiment, the light non-transmissive layer 3 is made of a metal material. However, the material of the light non-transmissive layer 3 is not particularly limited, and may include, for example, a resin material. The light non-transmissive layer 3 can be formed on the back surface 22 of the base member 2 through methods such as vapor deposition, sputtering, plating, painting, and adhesive bonding. The layer thickness of the light non-transmissive layer 3 is desirably constant, where the size of the layer thickness of the light non-transmissive layer 3 is desirably 0.001 mm to 0.5 mm, and more desirably, 0.01 mm to 0.1 mm.

The base member 2 made of a colored translucent body is a resin member. Examples of the material of the base member 2 include synthetic polymers such as a methyl methacrylate (co)polymer, polycarbonate, a styrene (co) polymer, and a methyl methacrylate-styrene copolymer; semi-synthetic polymers such as cellulose diacetate, cellulose triacetate, and cellulose acetate butyrate; polyesters such as polyethylene terephthalate and polylactic acid; polyamide; polyimide; polyether sulfone; polysulfone; polyethylene; polypropylene; polymethylpentene; polyvinyl chloride; polyvinyl acetal; polyether ketone; polyurethane; a polymer composite thereof (for example, a composite of polymethyl methacrylate and polylactic acid, a composite of polymethyl methacrylate and polyvinyl chloride); and glass.

The base member 2 in the first embodiment is a black translucent member. However, the color is not particularly limited, and the base member 2 merely needs to be a colored translucent member.

The base member 2 has a thin plate-like shape extending in the left and right direction of the vehicle, which is a vehicle width direction, and being curved to slightly bulge out toward the front side of the vehicle. The base member 2 includes a front surface 21, on the front side of the vehicle, facing the exterior of the vehicle; and the back surface 22, on the back side of the vehicle, facing the front surface 21 back to back. The front surface 21 in the embodiment is a flat surface curved to slightly bulge out toward the front side of the vehicle. The base member 2 may have a flat thin plate form that is not curved, and the front surface 21 may also be a flat surface that is not curved.

The back surface 22 in the embodiment is a surface having unevenness where a plurality of general portions 23 and gradually changing portions 24, to be described later, are alternately arranged. Specifically, a projection projecting out from the back surface 22 when viewed from the back surface 22 is formed on the back surface 22 configuring the gradually changing portion 24. In other words, a projection projecting out toward the light non-transmissive layer 3 relative to the back surface 22 configuring the general portion 23 is formed on the back surface 22 configuring the gradually changing portion 24.

Figure 4:
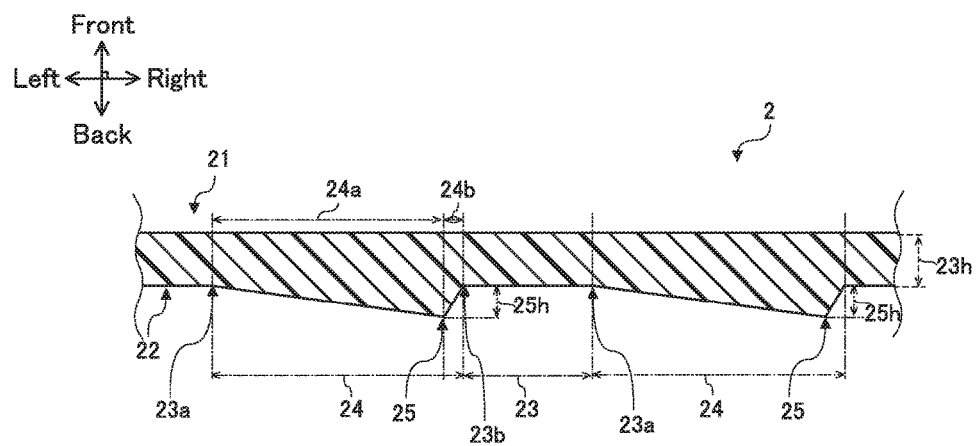
FIG. 4 is a cross-sectional view showing a base member in the first embodiment in the cross-sectional view shown in FIG. 3.

As shown in FIG. 4, the base member 2 includes the general portion 23 where a plate thickness is constant, and the gradually changing portion 24 where the plate thickness gradually changes. A plate thickness 23$h$ of the general portion 23 is advantageously greater than or equal to 2.5 mm and smaller than or equal to 4.0 mm in terms of enhancing the moldability such as flowability, crack, and the like of the resin. The plate thickness 23$h$ is more desirably greater than or equal to 2.7 mm and smaller than or equal to 3.5 mm. The plate thickness 23$h$ of the general portion 23 in the first embodiment is 3.0 mm.

The plate thickness of the gradually changing portion 24 in the first embodiment changes so as to gradually become larger than the plate thickness 23$h$ of the general portion 23. In other words, the gradually changing portion 24 is configured to project out toward the back side of the vehicle relative to the general portion 23 as the plate thickness gradually changes.

As shown in FIG. 4, the gradually changing portion 24 in the first embodiment includes a first gradually changing portion 24a and a second gradually changing portion 24b, which are continued with each other. The first gradually changing portion 24a is formed such that a length in a gradually changing direction becomes longer than the length of the second gradually changing portion 24b. Here, the term "gradually changing direction" refers to a direction the plate thickness gradually changes, that is, a left and right direction in the figure.

The first gradually changing portion 24a gradually changes so as to incline toward the back side of the vehicle from the left toward the right of the vehicle. The second gradually changing portion 24b gradually changes so as to incline toward the front side of the vehicle from the left toward the right of the vehicle. That is, the first gradually changing portion 24a and the second gradually changing portion 24b are disposed such that the gradually changing directions are opposite to each other. A maximum deviation portion 25, where the plate thickness of the gradually changing portion 24 becomes the largest, is formed at a boundary of the first gradually changing portion 24a and the second gradually changing portion 24b.

As shown in FIG. 4, the general portion 23 and the gradually changing portion 24 of the embodiment are continued. The first gradually changing portion 24a and the general portion 23 are continued at a first boundary portion 23a, and the second gradually changing portion 24b and the general portion 23 are continued at a second boundary portion 23b.

The length in the gradually changing direction of the first gradually changing portion 24a from the first boundary portion 23a to the maximum deviation portion 25 is desirably longer than or equal to 10 mm, and more desirably longer than or equal to 50 mm.

The base member 2 in the first embodiment has a translucent black color. Therefore, the first gradually changing portion 24a where the plate thickness of the base member 2 gradually becomes thicker from the first boundary portion 23a toward the maximum deviation portion 25 can be visually recognized by the observer as if the black becomes darker toward the maximum deviation portion 25. In other words, the gradation effect is exhibited. Thus, the vehicle exterior decorating member 1 of the first embodiment is advantageous in enhancing the design characteristics since the gradation effect is exhibited over a wider range as the length in the gradually changing direction of the first gradually changing portion 24a becomes longer.

Moreover, the length in the gradually changing direction of the second gradually changing portion 24b from the second boundary portion 23b to the maximum deviation portion 25 is shorter than the length in the gradually changing direction of the first gradually changing portion 24a, and is desirably shorter than 5 mm, and more desirably shorter than 3 mm.

The length in the gradually changing direction of the second gradually changing portion 24b influences the presentation of the color produced at the maximum deviation portion 25. The interval in the left and right direction between the maximum deviation portion 25 and the second boundary portion 23b becomes smaller as the length in the gradually changing direction of the second gradually changing portion 24b becomes shorter. That is, the interval in the left and right direction between the maximum deviation portion 25, which is visually recognized to become the darkest with respect to the observer, and the general portion 23, which is visually recognized to become the lightest with respect to the observer, becomes small. Thus, in the vehicle exterior decorating member 1 of the first embodiment, the contrast at one end of a gradation region exhibited by the gradually changing portion 24 can be clearly visually recognized by the observer.

The interval in the left and right direction between the maximum deviation portion 25 and the second boundary portion 23b becomes larger as the length in the gradually changing direction of the second gradually changing portion 24b becomes longer. That is, the interval in the left and right direction between the maximum deviation portion 25, which is visually recognized to become the darkest with respect to the observer, and the general portion 23, which is visually recognized to become the lightest with respect to the observer, becomes large. Thus, in the vehicle exterior decorating member 1 in the first embodiment, the contrast of the maximum deviation portion 25 in the gradation region exhibited by the gradually changing portion 24 can be visually recognized by the observer in a graded manner.

Furthermore, the vehicle exterior decorating member 1 of the first embodiment is excellent in moldability as the length in the gradually changing direction of the second gradually changing portion 24b becomes greater. This is because the second gradually changing portion 24b has a gentler inclined surface as the length in the gradually changing direction of the second gradually changing portion 24b becomes greater. In other words, the interior of a cavity for molding the second gradually changing portion 24b becomes gentle at the time of molding the vehicle exterior decorating member 1 of the first embodiment. The flowability of a flowable member (molten resin) that moves within a molding die thus enhances, whereby the vehicle exterior decorating member 1 of the first embodiment becomes advantageous in enhancing the moldability.

The vehicle exterior decorating member 1 in the first embodiment provides a gradation effect to the observer as the base member 2 made of a colored translucent body includes the general portion 23 and the gradually changing portion 24, as described above. The gradation effect provided to the observer is exhibited by the change in visible light transmissivity in the plate thickness direction of the gradually changing portion 24. In other words, the visible light transmissivity gradually becomes smaller from the first boundary portion 23a toward the maximum deviation portion 25 in the gradually changing zone from the first boundary portion 23a of the general portion 23 to the maximum deviation portion 25 at the first gradually changing portion 24a of the gradually changing portion 24, and thus, the gradation effect is exhibited. That is, the visible light transmissivity of the general portion 23 becomes the largest, and the visible light transmissivity of the maximum deviation portion 25 becomes the smallest. In this case, when a difference between the visible light transmissivity in the plate thickness direction at the general portion 23 and the visible light transmissivity in the plate thickness direction at the maximum deviation portion 25 of the gradually changing portion 24 is greater than or equal to 5%, a sufficient gradation effect is exhibited.

When the visible light transmissivity of the general portion 23 and the gradually changing portion 24 is too large, the transparency becomes high, and thus, the gradation effect is less likely to be exhibited. Furthermore, when the visible light transmissivity of the general portion 23 and the gradually changing portion 24 is too small, the transparency becomes low, and thus the gradation effect is also less likely to be exhibited. The visible light transmissivity in the plate thickness direction at the general portion 23 in the first embodiment is thus desirably greater than or equal to 25% and smaller than or equal to 40%. The visible light transmissivity in the plate thickness direction at the maximum deviation portion 25 is desirably greater than or equal to 10% and smaller than or equal to 25%. The gradually changing portion 24 is configured so as to obtain the visible light transmissivity within the above range, and the difference in the visible light transmissivity between the general portion 23 and the maximum deviation portion 25 is desirably greater than or equal to 5%. With the base member 2 configured in such manner, the vehicle exterior decorating member 1 in the first embodiment can provide the gradation effect of higher design characteristics to the observer.

The gradation effect provided to the observer is exhibited by the change in an L value in the gradually changing portion 24. Here, the L value is a value defined by the Lab color system defined in JIS Z 8729. When the L value gradually becomes smaller from the first boundary portion 23a toward the maximum deviation portion 25 in the gradually changing zone from the first boundary portion 23a of the general portion 23 to the maximum deviation portion 25 at the first gradually changing portion 24a of the gradually changing portion 24, the gradation effect is exhibited. That is, the L value of the general portion 23 becomes the largest and the L value of the maximum deviation portion 25 becomes the smallest. In this case, when a difference between the L value of the general portion 23 and the L value at the maximum deviation portion 25 of the gradually changing portion 24 is greater than or equal to two, a sufficient gradation effect is exhibited.

When the L value of the general portion 23 and the gradually changing portion 24 is too large, it becomes too bright, and thus, the gradation effect is less likely to be exhibited. When the L value of the general portion 23 and the gradually changing portion 24 is too small, it becomes too dark, and thus, the gradation effect is also less likely to be exhibited. The L value of the general portion 23 in the first embodiment is thus desirably greater than or equal to 20.0 and smaller than or equal to 26.0. The L value of the maximum deviation portion 25 is desirably greater than or equal to 18.0 and smaller than or equal to 24.0. The first gradually changing portion 24a is configured to obtain the L value of the above range, and the difference in the L value between the general portion 23 and the maximum deviation portion 25 is desirably greater than or equal to two. With the base member 2 configured in such manner, the vehicle exterior decorating member 1 in the first embodiment can provide a sufficient gradation effect of higher design characteristics to the observer.

The difference (maximum plate thickness difference 25h) between the plate thickness at the maximum deviation portion 25 of the gradually changing portion 24 and the plate thickness of the general portion 23 is desirably greater than or equal to 0.3 mm and smaller than or equal to 1.5 mm, and more desirably, greater than or equal to 0.5 mm and smaller than or equal to 0.9 mm.

When the vehicle exterior decorating member 1 in the first embodiment is large such that the size in the vehicle width direction is greater than or equal to 500 mm, for example, sink marks may be generated on the front surface 21 of the base member 2 during the manufacturing of the vehicle exterior decorating member 1. The sink marks may be generated from the difference in contraction amount of resin at the general portion 23 and the gradually changing portion 24 as the result of disposing, on the back surface 22 of the base member 2, the gradually changing portion 24 whose plate thickness becomes greater than the general portion 23.

As described above, in the base member 2 in the first embodiment, the difference (maximum plate thickness difference) 25h between the plate thickness at the maximum deviation portion 25 of the gradually changing portion 24 and the plate thickness of the general portion 23 is desirably greater than or equal to 0.3 mm and smaller than or equal to 1.5 mm, and more desirably greater than or equal to 0.5 mm and smaller than or equal to 0.9 mm. With the maximum plate thickness difference 25h configured in such manner, the generation of sink marks can be effectively suppressed. Furthermore, the gradation effect at the gradually changing portion 24 can be more sufficiently exhibited by configuring the gradually changing portion 24 so as to provide such maximum plate thickness difference 25h.

Next, a method for manufacturing the vehicle exterior decorating member 1 in the first embodiment will be described. The manufacturing method has a characteristic in an injection molding step of injection molding a molten resin, which is a flowable material, into a molding die 4. A method for manufacturing the vehicle exterior decorating member of the conventional art, for example, can be adopted for the other steps. Therefore, the injection molding step in the method for manufacturing the vehicle exterior decorating member 1 of the first embodiment will be hereinafter described.

Figure 5:
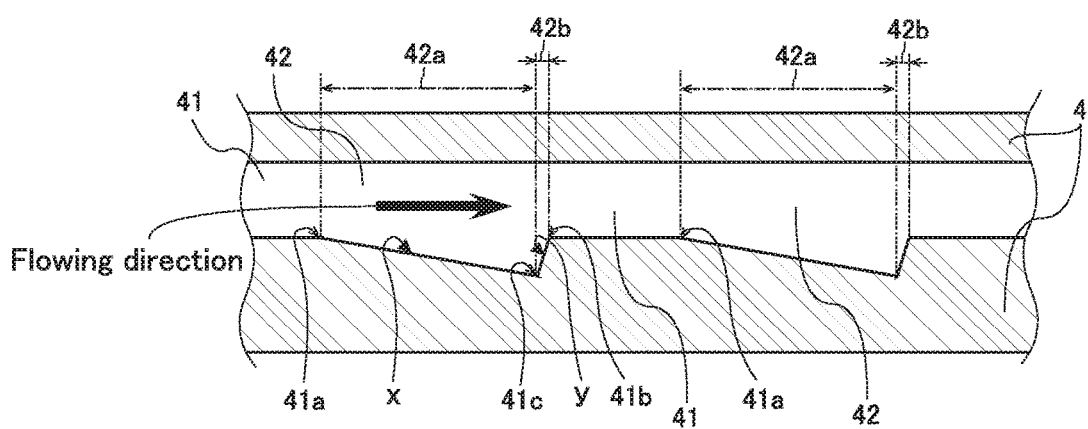
FIG. 5 is a partial cross-sectional view schematically showing a molding die used in a method for manufacturing the vehicle exterior decorating member according to the first embodiment.

FIG. 5 schematically shows a partial cross-section of the molding die 4 used in the method for manufacturing the vehicle exterior decorating member 1 in the first embodiment. As shown in FIG. 5, the molding die 4 includes a first cavity 41 for molding the general portion 23, and a second cavity 42 for molding the gradually changing portion 24.

The first cavity 41 includes a first end 41a, which becomes the first boundary portion 23a of the general portion 23 after the molding, and a second end 41b, which becomes the second boundary portion 23b of the general portion 23 after the molding. The first end 41a and the second end 41b become the boundary between the first cavity 41 and the second cavity 42.

The second cavity 42 includes a first gradually-changing-portion molding portion 42a for molding the first gradually changing portion 24a, a second gradually-changing-portion molding portion 42b for molding the second gradually changing portion 24b, and a maximum deviation molding portion 42c for molding the maximum deviation portion 25.

In the molding die 4 used in the injection molding step in the first embodiment, a plurality of first cavities 41 and second cavities 42 are arranged alternately and continuously. In other words, the first end 41a of the first cavity 41 and the first gradually-changing-portion molding portion 42a of the second cavity 42 are continued. Furthermore, the second end 41b of the first cavity 41 and the second gradually-changing-portion molding portion 42b of the second cavity 42 are continued.

The size of the first gradually-changing-portion molding portion 42a in the flowing direction of the flowable material shown in FIG. 5 is configured to be greater than the size of the second gradually-changing-portion molding portion 42b.

As shown in FIG. 5, the first gradually-changing-portion molding portion 42a of the second cavity 42 is configured such that the flow path cross-sectional area gradually becomes larger from the first end 41a of the first cavity 41 toward the maximum deviation molding portion 42c. The second gradually-changing-portion molding portion 42b of the second cavity 42 is configured such that the flow path cross-sectional area gradually becomes smaller from the maximum deviation molding portion 42c toward the second end 41b of the first cavity 41.

In other words, the first gradually-changing-portion molding portion 42a has an inclined surface x that gradually inclines toward the lower side in a direction of gravitational force from the first end 41a of the first cavity 41 toward the maximum deviation molding portion 42c. The second gradually-changing-portion molding portion 42b, on the other hand, has an inclined surface y that gradually inclines toward the upper side in the direction of gravitational force from the maximum deviation molding portion 42c toward the second end 41b of the first cavity 41. As described above, the size of the first gradually-changing-portion molding portion 42a is configured to be greater than the size of the second gradually-changing-portion molding portion 42b. Therefore, the inclined surface x becomes a gentler surface than the inclined surface y.

In the injection molding step in the first embodiment, the molten resin, which is a flowable material, is injected into the molding die 4 such that the molten resin flows from the first end 41a of the first cavity 41 toward the maximum deviation molding portion 42c of the second cavity 42. An injection start gate where the molten resin is injected into the molding die 4 is desirably disposed at the central part in the vehicle width direction of the molding die 4.

When the molten resin is injected into the molding die 4 in such manner, the molten resin flows through the molding die 4 in the following manner. In other words, the molten resin flows from the second end 41b toward the first end 41a in the first cavity 41. The molten resin flows from the first gradually-changing-portion molding portion 42a toward the second gradually-changing-portion molding portion 42b in the second cavity 42. That is, the molten resin flows through the second cavity 42 in a direction the flow path cross-sectional area becomes larger.

According to the method for manufacturing the vehicle exterior decorating member 1 in the first embodiment including the injection molding step described above, the molten resin flows from the first gradually-changing-portion molding portion 42a toward the second gradually-changing-portion molding portion 42b in the second cavity 42. The first gradually-changing-portion molding portion 42a includes the inclined surface x, and the second gradually-changing-portion molding portion 42b includes the inclined surface y. The inclined surface x is gentler than the inclined surface y, and hence the molten resin can be sufficiently filled in the maximum deviation molding portion 42c when the molten resin is flowed from the inclined surface x toward the inclined surface y. Therefore, the method for manufacturing the vehicle exterior decorating member 1 of the first embodiment is advantageous in enhancing the moldability.

Second Embodiment

A vehicle exterior decorating member 1 in a second embodiment has a configuration in which the plate thickness of a gradually changing portion 64 in a base member 6 is smaller than the plate thickness of a general portion 63. The vehicle exterior decorating member 1 of the second embodiment differs from the vehicle exterior decorating member 1 of the first embodiment with regards to such configuration, and is similar with regards to the other configurations. Therefore, the configuration different from the first embodiment will be described below.

Figure 6:
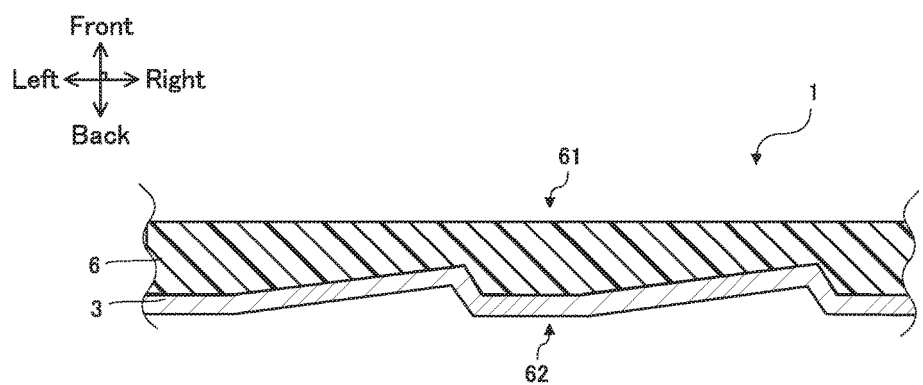
FIG. 6 is a cross-sectional view, taken along line III-III in FIG. 2, of the vehicle exterior decorating member according to the second embodiment.

As shown in FIG. 6, the vehicle exterior decorating member 1 in the second embodiment includes a base member 6 made of a colored translucent body, and a light non-transmissive layer 3 formed on a back surface 62 of the base member 6. The light non-transmissive layer 3 is integrally formed on the back surface 62 of the base member 6.

Figure 7:
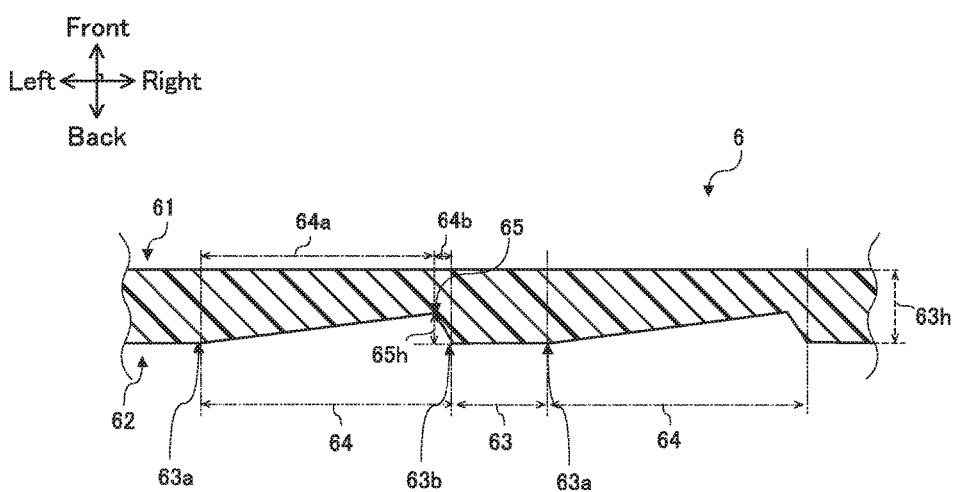
FIG. 7 is a cross-sectional view showing a base member in the second embodiment in the cross-sectional view shown in FIG. 6.

As shown in FIG. 7, the base member 6 includes the general portion 63 where the plate thickness 63h is constant, and the gradually changing portion 64 where the plate thickness gradually changes. The plate thickness of the gradually changing portion 64 in the second embodiment changes so as to gradually become smaller than the plate thickness 63h of the general portion 63. In other words, the gradually changing portion 64 is configured to depress toward the front side of the vehicle (toward the front surface 61) relative to the general portion 63 as the plate thickness gradually changes.

As shown in FIG. 7, a first gradually changing portion 64a in the second embodiment gradually changes so as to incline toward the front side of the vehicle from the left toward the right of the vehicle. A second gradually changing portion 64b gradually changes so as to incline toward the back side of the vehicle from the left toward the right of the vehicle. A maximum deviation portion 65 where the plate thickness of the gradually changing portion 64 becomes the smallest is formed at a boundary between the first gradually changing portion 64a and the second gradually changing portion 64b. Therefore, the gradually changing portion 64a where the plate thickness of the base member 6 gradually becomes smaller from the first boundary portion 63a toward the maximum deviation portion 65 can be visually recognized by the observer as if the black becomes lighter toward the maximum deviation portion 65. In other words, the gradation effect is exhibited. In the second embodiment, a difference between the plate thickness at the maximum deviation portion 65 of the gradually changing portion 64 and the plate thickness of the general portion 63 is shown in FIG. 7 as a maximum plate thickness difference 65h.

In the vehicle exterior decorating member 1 in the second embodiment, the gradation effect is exhibited as the visible light transmissivity gradually becomes larger from the first boundary portion 63a toward the maximum deviation portion 65 in the gradually changing zone from the first boundary portion 63a of the general portion 63 to the maximum deviation portion 65 in the first gradually changing portion 64a of the gradually changing portion 64. That is, the visible light transmissivity of the general portion 63 becomes the smallest, and the visible light transmissivity of the maximum deviation portion 65 becomes the largest. In this case, when a difference between the visible light transmissivity in the plate thickness direction at the general portion 63 and the visible light transmissivity in the plate thickness direction at the maximum deviation portion 65 of the gradually changing portion 64 is greater than or equal to 5%, a sufficient gradation effect is exhibited for reasons similar to the first embodiment.

The gradation effect provided to the observer is exhibited by the change in the L value at the gradually changing portion 64. When the L value gradually becomes larger from the first boundary portion 63a toward the maximum deviation portion 65 in the gradually changing zone from the first boundary portion 63a of the general portion 63 to the maximum deviation portion 65 in the first gradually changing portion 64a of the gradually changing portion 64, the gradation effect is exhibited. That is, the L value of the general portion 63 becomes the smallest, and the L value of the maximum deviation portion 65 becomes the largest. In this case, when a difference between the L value of the general portion 63 and the L value at the maximum deviation portion 65 of the gradually changing portion 64 is greater than or equal to two, a sufficient gradation effect is exhibited for reasons similar to the first embodiment.

Third Embodiment

A vehicle exterior decorating member 1 of a third embodiment differs from the vehicle exterior decorating member 1 of the first embodiment in the shape of the gradually changing portion. That is, the front surface 21 is a flat surface and the back surface 22 is a surface having unevenness in the gradually changing portion 24 in the vehicle exterior decorating member 1 of the first embodiment, whereas both a front surface 71 and a back surface 72 are surfaces having unevenness in the gradually changing portion 74 in the vehicle exterior decorating member 1 of the third embodiment. The vehicle exterior decorating member 1 of the third embodiment differs from the vehicle exterior decorating member 1 of the first embodiment with regards to such configuration, and is similar with regards to the other configurations. Therefore, the configuration different from the first embodiment will be described below.

Figure 8:
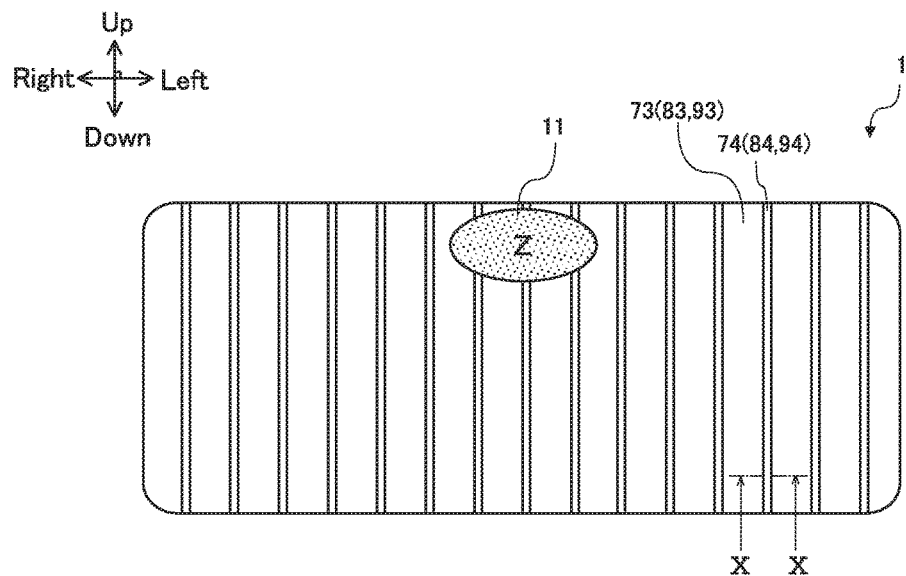
FIG. 8 is a front view schematically showing a vehicle exterior decorating member according to third to fifth embodiments.
Figure 9:
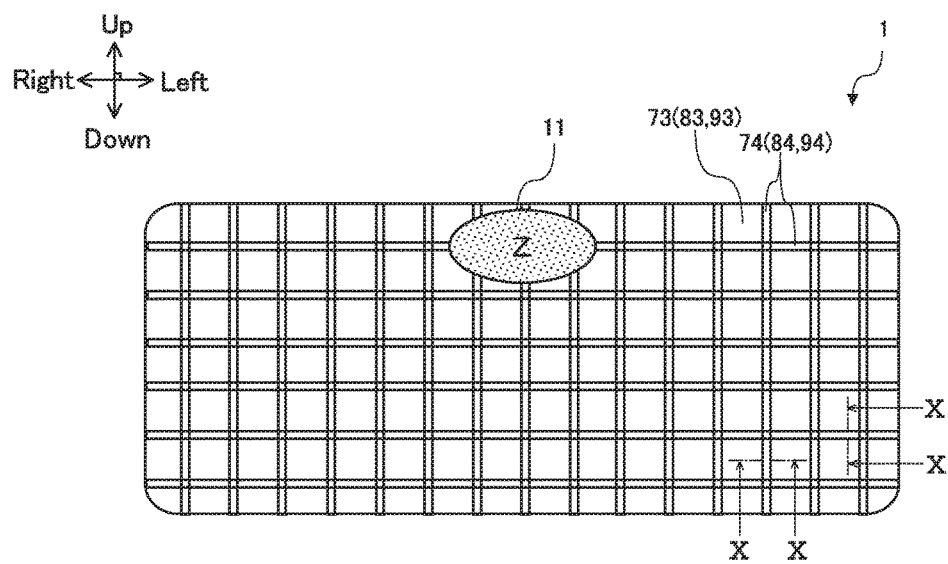
FIG. 9 is a front view schematically showing other modes of the vehicle exterior decorating member according to the third to fifth embodiments.

In the vehicle exterior decorating member 1 of the third embodiment, a base member 7 may include a stripe-shaped gradually changing portion 74 as shown in FIG. 8, and a lattice-shaped gradually changing portion 74 as shown in FIG. 9.

Figure 10:
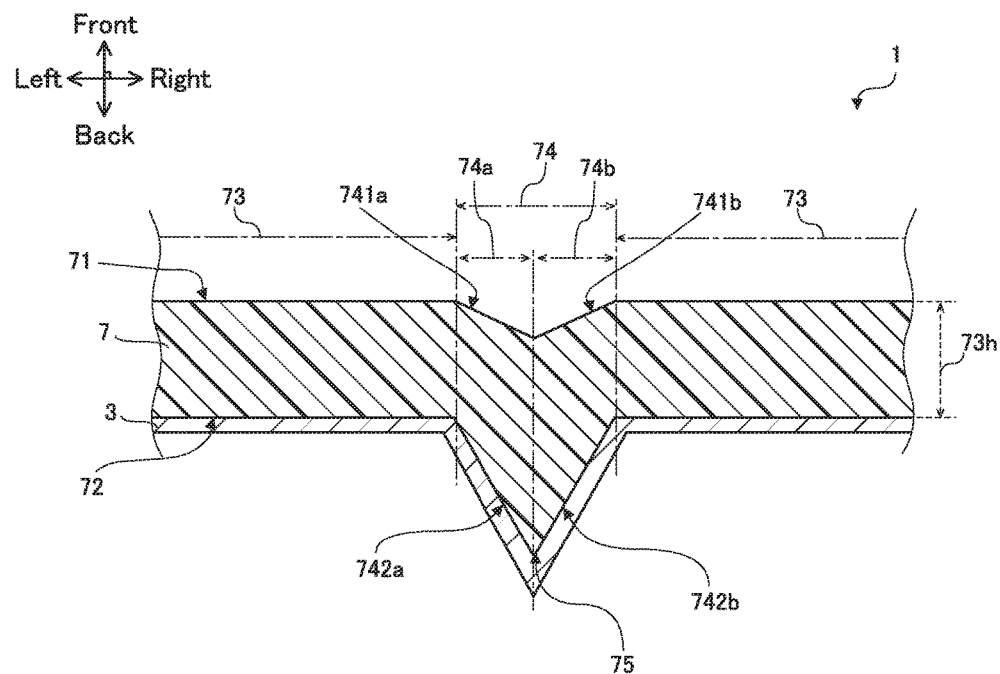
FIG. 10 is a cross-sectional view, taken along line X-X in FIGS. 8 and 9, of the vehicle exterior decorating member according to the third embodiment.

As shown in FIG. 10, a recess depressed toward the back surface 72 side relative to the front surface 71 configuring the general portion 73 when viewed from the front surface 71 is formed on the front surface 71 configuring the gradually changing portion 74. In other words, the front surface 71 configuring the gradually changing portion 74 has an isosceles triangular cross-section where the vertex is located on the back surface 72 side. Furthermore, a projection projecting out toward the light non-transmissive layer 3 relative to the back surface 72 configuring the general portion 73 when viewed from the back surface 72 is formed on the back surface 72 configuring the gradually changing portion 74. In other words, the back surface 72 configuring the gradually changing portion 74 has an isosceles triangular cross-section where the vertex is located on the light non-transmissive layer 3 side.

As shown in FIG. 10, the gradually changing portion 74 in the third embodiment includes a first gradually changing portion 74a and a second gradually changing portion 74b, which are continued with each other. The first gradually changing portion 74a and the second gradually changing portion 74b are formed to have the same length in the gradually changing direction. The vertex of the front surface 71 having the isosceles triangular cross-section in the gradually changing portion 74 is located on the back side relative to the base, and similarly, the vertex of the back surface 72 having the isosceles triangular cross-section in the gradually changing portion 74 is located on the back side relative to the base. In addition, the vertex of the front surface 71 and the vertex of the back surface 72 are both formed to locate on a straight line parallel to the front and back direction. That is, the front surface 71 in the gradually changing portion 74 is formed to follow the shape of the back surface 72 in the gradually changing portion 74.

The first gradually changing portion 74a gradually changes so as to incline toward the back side of the vehicle from the left toward the right of the vehicle and so that the plate thickness becomes larger. The second gradually changing portion 74b gradually changes so as to incline toward the front side of the vehicle from the left toward the right of the vehicle and so that the plate thickness becomes smaller. That is, as shown in FIG. 10, the first gradually changing portion 74a and the second gradually changing portion 74b are disposed such that the gradually changing directions are opposite to each other. A maximum deviation portion 75, where the plate thickness of the gradually changing portion 74 becomes the largest, is formed at a boundary between the first gradually changing portion 74a and the second gradually changing portion 74b. The first gradually changing portion 74a and the second gradually changing portion 74b formed in such manner have bilaterally symmetrical shapes with respect to each other with the maximum deviation portion as the center.

The first gradually changing portion 74a in the third embodiment includes a first gradually changing front surface 741a, which is a part of the front surface 71, and a first gradually changing back surface 742a, which is a part of the back surface 72. The second gradually changing portion 74b includes a second gradually changing front surface 741b, which is a part of the front surface 71, and a second gradually changing back surface 742b, which is a part of the back surface 72.

The first gradually changing front surface 741a is inclined toward the back side of the vehicle from the front surface 71 configuring the general portion 73 to the maximum deviation portion 75. The first gradually changing back surface 742a, which is a part of the back surface 72, is also inclined toward the back side of the vehicle from the back surface 72 configuring the general portion 73 to the maximum deviation portion 75. The first gradually changing front surface 741a is a gentler inclined surface than the first gradually changing back surface 742a. The plate thickness of the first gradually changing portion 74a is formed to gradually become larger from the general portion 73 continued to the first gradually changing portion 74a to the maximum deviation portion 75. The second gradually changing portion 74b has a shape similar to the first gradually changing portion 74a, as described above.

In the vehicle exterior decorating member 1 in the third embodiment, the plate thickness gradually becomes larger in the gradually changing zone from the boundary between the first gradually changing portion 74a and the general portion 73 to the maximum deviation portion 75 in the first gradually changing portion 74a, that is, the visible light transmissivity gradually becomes smaller toward the maximum deviation portion 75, and thus, the gradation effect is exhibited. Similarly, the visible light transmissivity gradually becomes smaller from the boundary between the second gradually changing portion 74b and the general portion 73 to the maximum deviation portion 75 in the second gradually changing portion 74b as well, and thus, the gradation effect is exhibited. That is, the visible light transmissivity of the general portion 73 becomes the largest, and the visible light transmissivity of the maximum deviation portion 75 becomes the smallest. In this case, when a difference between the visible light transmissivity of the general portion 73 and the visible light transmissivity of the maximum deviation portion 75 is greater than or equal to 5%, sufficient gradation effect is exhibited for reasons similar to the first embodiment.

The gradation effect provided to the observer is exhibited by the change in L value in the gradually changing portion 74. The gradation effect is exhibited as the L value gradually becomes smaller toward the maximum deviation portion 75 from the boundaries between the general portion 73 and the first gradually changing portion 74a and between the general portion 73 and the second gradually changing portion 74b. That is, the L value of the general portion 73 becomes the largest, and the L value of the maximum deviation portion 75 becomes the smallest. In this case, when a difference between the L value of the general portion 73 and the L value of the maximum deviation portion 75 is greater than or equal to two, sufficient gradation effect is exhibited for reasons similar to the first embodiment.

In the gradually changing portion 74 in the third embodiment, the first gradually changing portion and the second gradually changing portion have bilaterally symmetrical shapes with respect to each other. Therefore, regardless of from which direction, left or right, the observer viewed the vehicle exterior decorating member 1 of the third embodiment, similar gradation effect can be exhibited. The vehicle exterior decorating member of the third embodiment is thus advantageous in further enhancing the design characteristics.

The gradually changing portion 74 in the third embodiment includes the front surface 71 including inclined surfaces of the first gradually changing front surface 741a and the second gradually changing front surface 741b, unlike the flat front surface 21 of the gradually changing portion 24 in the first embodiment. Therefore, in each embodiment, the reflection and refraction of light that reached the front surface of the gradually changing portion are different from each other. The gradation effects exhibited by the gradually changing portion 74 in the third embodiment and the gradually changing portion 24 in the first embodiment are thus different from each other. In particular, in the case of the gradually changing portion 74 in the third embodiment, various gradation effects and three-dimensional effects can be exhibited compared to the first embodiment by provision of the first gradually changing front surface 741a and the second gradually changing front surface 741b, which are inclined surfaces. Therefore, the vehicle exterior decorating member of the third embodiment is advantageous in further enhancing the design characteristics.

As shown in FIG. 10, in the gradually changing portion 74 in the third embodiment, a recess of the front surface 71 is formed at the position corresponding to the projection formed on the back surface 72. In other words, the vertices (vertex angles) of the isosceles triangular cross-sections of the front surface 71 and the back surface 72 are formed to be directed in the same direction. Thus, the plate thickness of the gradually changing portion 74 can be suppressed from becoming too large by the projection formed on the back surface 72. In other words, sink marks generated when the plate thickness becomes too large can be effectively suppressed. Therefore, the vehicle exterior decorating member 1 of the third embodiment is advantageous in enhancing the moldability.

Fourth Embodiment

Similar to the vehicle exterior decorating member 1 of the third embodiment, in a vehicle exterior decorating member 1 of the fourth embodiment, both a front surface 81 and a back surface 82 of the base member 8 are surfaces having unevenness. However, the fourth embodiment differs from the third embodiment in the shape of the back surface 82 of the base member 8 in the gradually changing portion 84. In other words, the projection projecting out from the back surface 72 when viewed from the back surface 72 is formed on the back surface 72 configuring the gradually changing portion 74 in the third embodiment, whereas a recess depressed toward the front surface 81 when viewed from the back surface 82 is formed on the back surface 82 configuring the gradually changing portion 84 in the fourth embodiment.

The vehicle exterior decorating member 1 of the fourth embodiment differs from the vehicle exterior decorating member 1 of the third embodiment with regards to such configuration, and is similar with regards to the other configurations. Therefore, the configuration different from the third embodiment will be described below.

Figure 11:
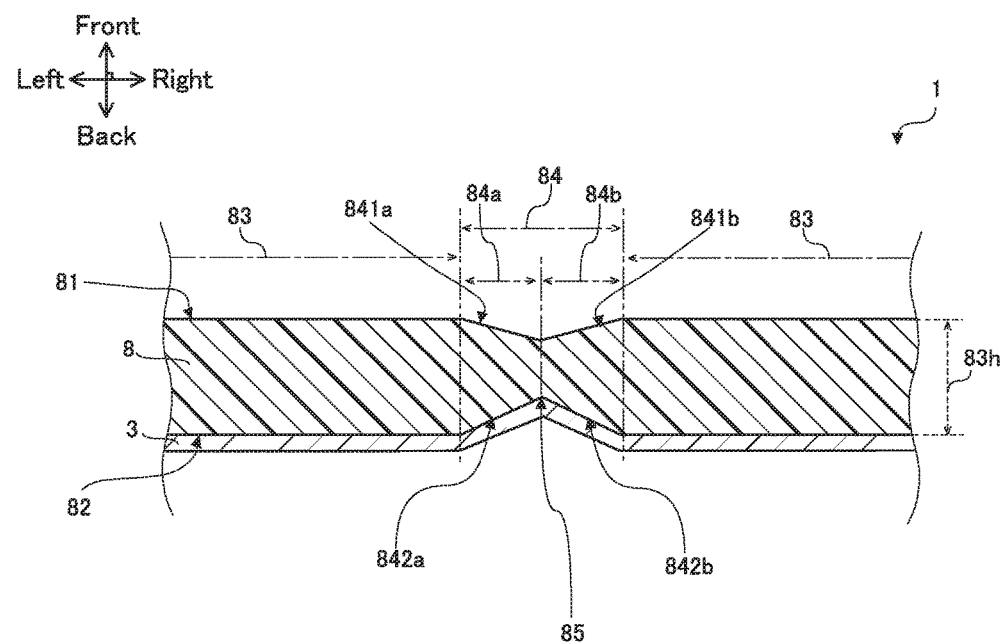
FIG. 11 is a cross-sectional view, taken along line X-X in FIGS. 8 and 9, of the vehicle exterior decorating member according to the fourth embodiment.

As shown in FIG. 11, the recess depressed toward the front surface 81 relative to the back surface 82 configuring the general portion 83 is formed on the back surface 82 configuring the gradually changing portion 84. Specifically, the front surface 81 configuring the gradually changing portion 84 has an isosceles triangular cross-section in which the vertex is located on the back surface 82 side. Furthermore, the back surface 82 configuring the gradually changing portion 84 has an isosceles triangular cross-section in which the vertex is located on the front surface 81 side.

As shown in FIG. 11, the gradually changing portion 84 in the fourth embodiment includes a first gradually changing portion 84a and a second gradually changing portion 84b, which are continued with each other. The first gradually changing portion 84a and the second gradually changing portion 84b are formed to have the same length in the gradually changing direction. The vertex of the front surface 81 having the isosceles triangular cross-section in the gradually changing portion 84 is located on the back side relative to the base, whereas the vertex of the back surface 82 having the isosceles triangular cross-section in the gradually changing portion 84 is located on the front side relative to the base. In addition, the vertex of the front surface 81 and the vertex of the back surface 82 are both formed to locate on a straight line parallel to the front and back direction. Thus, the recess of the front surface 81 in the gradually changing portion 84 and the recess of the back surface 82 in the gradually changing portion 74 are formed so that the vertices (vertex angles) of the isosceles triangular cross-section face each other.

The first gradually changing portion 84a gradually changes so that the plate thickness becomes smaller from the left toward the right of the vehicle. The second gradually changing portion 84b gradually changes so that the plate thickness becomes larger from the left toward the right of the vehicle. That is, the first gradually changing portion 84a and the second gradually changing portion 84b are disposed such that the gradually changing directions are opposite to each other. A maximum deviation portion 85, where the plate thickness of the gradually changing portion 84 becomes the smallest, is formed at a boundary between the first gradually changing portion 84a and the second gradually changing portion 84b. The first gradually changing portion 84a and the second gradually changing portion 84b have bilaterally symmetrical shapes with respect to each other with the maximum deviation portion 85 as the center.

The first gradually changing portion 84a in the fourth embodiment includes a first gradually changing front surface 841a and a first gradually changing back surface 842a. The first gradually changing front surface 841a is inclined toward the back side of the vehicle from the front surface 81 configuring the general portion 83 to the maximum deviation portion 85. The first gradually changing back surface 842a, which is a part of the back surface 82, is inclined toward the front side of the vehicle from the back surface 82 configuring the general portion 83 to the maximum deviation portion 85. The first gradually changing front surface 841a is a gentler inclined surface than the first gradually changing back surface 842a. Thus, the inclining directions of the first gradually changing front surface 841a and the first gradually changing back surface 842a are different from each other, whereby the plate thickness of the first gradually changing portion 84*a* is formed so as to gradually become smaller from the general portion 83 continued to the first gradually changing portion 84*a* to the maximum deviation portion 85. Furthermore, the second gradually changing portion 84*b* includes a second gradually changing front surface 841*b* and a second gradually changing back surface 842*b*. The second gradually changing portion 84*b* has a shape similar to the first gradually changing portion 84*a* described above.

In the vehicle exterior decorating member 1 in the fourth embodiment, the plate thickness gradually becomes smaller in the gradually changing zone from the boundary between the first gradually changing portion 84*a* and the general portion 83 to the maximum deviation portion 85 in the first gradually changing portion 84*a*, that is, the visible light transmissivity gradually becomes larger toward the maximum deviation portion 85, and thus, the gradation effect is exhibited. Similarly, the visible light transmissivity gradually becomes larger from the boundary between the second gradually changing portion 84*b* and the general portion 83 to the maximum deviation portion 85 in the second gradually changing portion 84*b* as well, and thus, the gradation effect is exhibited. That is, the visible light transmissivity of the general portion 83 becomes the smallest, and the visible light transmissivity of the maximum deviation portion 85 becomes the largest. In this case, when a difference between the visible light transmissivity of the general portion 83 and the visible light transmissivity of the maximum deviation portion 85 is greater than or equal to 5%, sufficient gradation effect is exhibited for reasons similar to the first embodiment.

The gradation effect provided to the observer is exhibited by the change in L value in the gradually changing portion 84. The gradation effect is exhibited as the L value gradually becomes larger toward the maximum deviation portion 85 from the boundary between the general portion 83 and the first gradually changing portion 84*a* and between the general portion 83 and the second gradually changing portion 84*b*. That is, the L value of the general portion 83 becomes the smallest, and the L value of the maximum deviation portion 85 becomes the largest. In this case, when a difference between the L value of the general portion 83 and the L value of the maximum deviation portion 85 is greater than or equal to two, sufficient gradation effect is exhibited for reasons similar to the first embodiment.

In the gradually changing portion 84 in the fourth embodiment, the first gradually changing portion 84*a* and the second gradually changing portion 84*b* have bilaterally symmetrical shapes with respect to each other. Thus, effects similar to the third embodiment are obtained.

The gradually changing portion 84 in the fourth embodiment includes the front surface 81 including inclined surfaces of the first gradually changing front surface 841*a* and the second gradually changing front surface 841*b*, unlike the flat front surface 61 of the gradually changing portion 64 in the second embodiment. Therefore, in each embodiment, the reflection and refraction of light that reached the front surface of the gradually changing portion are different from each other. The gradation effects exhibited by the gradually changing portion 84 in the fourth embodiment and the gradually changing portion 64 in the second embodiment are thus different from each other. In particular, in the case of the gradually changing portion 84 in the fourth embodiment, various gradation effects and three-dimensional effects can be exhibited compared to the second embodiment by provision of the first gradually changing front surface 841*a* and the second gradually changing front surface 841*b*, which are inclined surfaces. Therefore, the vehicle exterior decorating member of the fourth embodiment is advantageous in further enhancing the design characteristics.

Fifth Embodiment

Similar to the gradually changing portion 74 in the third embodiment, in a vehicle exterior decorating member 1 of a fifth embodiment, a recess depressed toward a back surface 92 relative to a front surface 91 configuring a general portion 93 is formed on the front surface 91 configuring a gradually changing portion 94, and a projection projecting out from the back surface 92 when viewed from the back surface 92 is formed on the back surface 92 configuring the gradually changing portion 94. However, the gradually changing portion 94 in the fifth embodiment includes a plurality of gradually changing zones, unlike the gradually changing portion 74 in the third embodiment. Such a different configuration will be described below.

Figure 12:
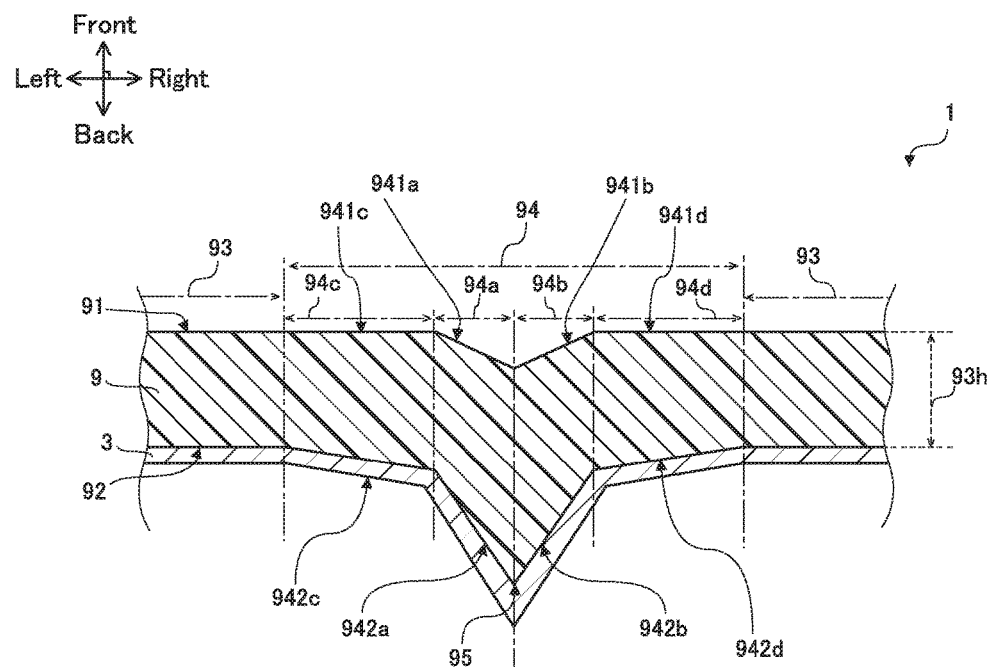
FIG. 12 is a cross-sectional view, taken along line X-X in FIGS. 8 and 9, of the vehicle exterior decorating member according to the fifth embodiment.

The gradually changing portion 94 in the fifth embodiment includes four gradually changing portions, that is, a first gradually changing portion 94*a*, a second gradually changing portion 94*b*, a third gradually changing portion 94*c*, and a fourth gradually changing portion 94*d*. As shown in FIG. 12, the third gradually changing portion 94*c*, the first gradually changing portion 94*a*, the second gradually changing portion 94*b*, and the fourth gradually changing portion 94*d* are continued in order from the left toward the right. The gradually changing directions of the first gradually changing portion 94*a* and the third gradually changing portion 94*c* are the same, and the gradually changing directions of the second gradually changing portion 94*b* and the fourth gradually changing portion 94*d* are the same. The gradually changing directions of the first gradually changing portion 94*a* and the third gradually changing portion 94*c*, and the second gradually changing portion 94*b* and the fourth gradually changing portion 94*d* are different with respect to each other. A maximum deviation portion 95, where the plate thickness of the gradually changing portion 94 becomes the largest, is formed at a boundary between the first gradually changing portion 94*a* and the second gradually changing portion 94*b*, which is a portion where the gradually changing direction changes. In the fifth embodiment, the first gradually changing portion 94*a* and the second gradually changing portion 94*b* have bilaterally symmetrical shapes with respect to each other with the maximum deviation portion 95 as the center, and the third gradually changing portion 94*c* and the fourth gradually changing portion 94*d* have bilaterally symmetrical shapes with each other with the maximum deviation portion 95 as the center.

The front surface 91 configuring the gradually changing portion 94 includes a flat third gradually changing front surface 941*c* continued to the front surface 91 configuring the general portion 93, a first gradually changing front surface 941*a* continued to the third gradually changing front surface 941*c*, a second gradually changing front surface 941*b* continued to the first gradually changing front surface 941*a* and having an inclining direction different from the first gradually changing front surface 941*a*, and a flat fourth gradually changing front surface 941*d* continued to the second gradually changing front surface 941*b* and continued to the front surface 91 of the general portion 93. In other words, the gradually changing portion 94 of the fifth embodiment has the third gradually changing front surface 941*c*, the first gradually changing front surface 941*a*, the second gradually changing front surface 941*b*, and the fourth gradually changing front surface 941*d* continued in order from the left toward the right of the vehicle.

As shown in FIG. 12, the third gradually changing front surface 941*c* is an extension of the front surface 91 in the general portion 93 on the left side, that is, has a flat surface. The first gradually changing front surface 941*a* is inclined toward the back side from the left side toward the right side. The second gradually changing front surface 941*b* is inclined toward the front side from the left side toward the right side. In other words, the first gradually changing front surface 941*a* and the second gradually changing front surface 941*b* are inclined surfaces having inclining directions different from each other. The fourth gradually changing front surface 941*d* is an extension of the front surface 91 in the general portion 93 on the right side, that is, has a flat surface.

The back surface 92 configuring the gradually changing portion 94 includes a third gradually changing back surface 942*c* continued to the back surface 92 configuring the general portion 93, a first gradually changing back surface 942*a* continued to the third gradually changing back surface 942*c*, a second gradually changing back surface 942*b* continued to the first gradually changing back surface 942*a* and having an inclining direction different the first gradually changing back surface 942*a*, and a fourth gradually changing back surface 942*d* continued to the second gradually changing back surface 942*b* and continued to the back surface 92 of the general portion 93. In other words, the gradually changing portion 94 of the fifth embodiment has the third gradually changing back surface 942*c*, the first gradually changing back surface 942*a*, the second gradually changing back surface 942*b*, and the fourth gradually changing back surface 942*d* continued in order from the left toward the right of the vehicle. The first gradually changing back surface 942*a* and the third gradually changing back surface 942*c* have the same inclining directions, and the second gradually changing back surface 942*b* and the fourth gradually changing back surface 942*d* have the same inclining directions but different inclining directions with the first gradually changing back surface 942*a* and the third gradually changing back surface 942*c*.

As shown in FIG. 12, the first gradually changing back surface 942*a* and the third gradually changing back surface 942*c* are both inclined toward the back side from the left toward the right side. The third gradually changing back surface 942*c* is inclined gentler than the first gradually changing back surface 942*a*. The second gradually changing back surface 942*b* and the fourth gradually changing back surface 942*d* are both inclined toward the front side from the left toward the right side. The fourth gradually changing back surface 942*d* is inclined gentler than the second gradually changing back surface 942*b*.

The third gradually changing portion 94*c* of the fifth embodiment includes the third gradually changing front surface 941*c* and the third gradually changing back surface 942*c*, and is formed so that the plate thickness becomes larger from the left toward the right. The first gradually changing portion 94*a* includes the first gradually changing front surface 941*a* and the first gradually changing back surface 942*a*, and is formed so that the plate thickness becomes larger from the left toward the right. The third gradually changing portion 94*c* and the first gradually changing portion 94*a* are formed so that the respective gradually changing percentages differ from each other. Here, "gradually changing percentage" means the amount of change in the plate thickness with respect to the length in the gradually changing direction. In other words, the amount of change in plate thickness that becomes larger from the left toward the right at the third gradually changing portion 94*c* and the amount of change in plate thickness that becomes larger from the left toward the right at the first gradually changing portion 94*a* are different from each other. In the fifth embodiment, the gradually changing percentage of the third gradually changing portion 94*c* is smaller than the gradually changing percentage of the first gradually changing portion 94*a*. The relationship of the gradually changing percentages of the second gradually changing portion 94*b* and the fourth gradually changing portion 94*d* is similar to the relationship of the gradually changing percentages of the third gradually changing portion 94*c* and the first gradually changing portion 94*a*.

As described above, the third gradually changing portion 94*c* and the fourth gradually changing portion 94*d* of the fifth embodiment have bilaterally symmetrical shapes with the maximum deviation portion 95 as a center, and the first gradually changing portion 94*a* and the second gradually changing portion 94*b* have bilaterally symmetrical shapes with the maximum deviation portion 95 as the center. Therefore, the gradually changing percentage of the third gradually changing portion 94*c* is the same as the gradually changing percentage of the fourth gradually changing portion 94*d*, and the gradually changing percentage of the first gradually changing portion 94*a* is the same as the gradually changing percentage of the second gradually changing portion 94*b*.

The vehicle exterior decorating member 1 in the fifth embodiment described above has the following effects. In other words, the third gradually changing portion 94*c* and the fourth gradually changing portion 94*d* in the fifth embodiment have shapes similar to the gradually changing portion 24 in the first embodiment. Thus, the vehicle exterior decorating member 1 in the fifth embodiment obtains operation effects similar to those of the vehicle exterior decorating member 1 of the first embodiment. The first gradually changing portion 94*a* and the second gradually changing portion 94*b* of the fifth embodiment have shapes similar to those of the gradually changing portion 74 of the third embodiment. Thus, the vehicle exterior decorating member 1 in the fifth embodiment obtains the operation effects similar to those of the vehicle exterior decorating member 1 of the third embodiment.

The vehicle exterior decorating member 1 of the fifth embodiment includes the gradually changing portion 94 configured by connecting the four gradually changing portions. Therefore, according to the vehicle exterior decorating member 1 of the fifth embodiment, different gradation effects can be continuously exhibited depending on the direction the observer views the vehicle exterior decorating member 1 of the fifth embodiment. The vehicle exterior decorating member 1 of the fifth embodiment thus becomes advantageous in further enhancing the design characteristics.

In the gradually changing portion 94 in the fifth embodiment, the gradually changing percentage of the third gradually changing portion 94*c* and the gradually changing percentage of the first gradually changing portion 94*a* are different from each other. In other words, the vehicle exterior decorating member 1 of the fifth embodiment is configured so that the plate thickness gradually becomes larger from the general portion 93 to the maximum deviation portion 95, and can provide different gradation effects at the first gradually changing portion 94*a* and the second gradually changing portion 94*b*. That is, two different gradation effects can be continuously exhibited at the gradually changing portion 94.

Therefore, the vehicle exterior decorating member 1 of the fifth embodiment is advantageous in further enhancing the design characteristics, compared to the first embodiment and the third embodiment.

Preferred embodiments of the present invention have been described in detail with reference to the drawings, but the present invention is not limited to the embodiments described above, and various modifications can be made without departing from the scope of the present invention. Specifically, effects similar to the present invention can be obtained even with the following configurations.

For example, a pass-through opening for introducing outside air into the engine room of the vehicle may be formed in the vehicle exterior decorating member 1 in the first embodiment.

The general portion 23 in the first embodiment is configured such that the first gradually changing portion 24a and the second gradually changing portion 24b of the gradually changing portion 24 are continuous to each other. However, the configuration in which the second gradually changing portion 24b is not disposed may be adopted. In other words, the maximum deviation portion 25 may be formed such that the second boundary portion 23b and the maximum deviation portion 25 are located on a straight line parallel to the front and back direction in FIG. 4. Furthermore, similarly in the second embodiment as well, the maximum deviation portion 65 may be configured such that the second boundary portion 63b and the maximum deviation portion 65 are located on a straight line parallel to the front and back direction in FIG. 7.

In the gradually changing portion 74 in the third embodiment, the shapes of the front surface 71 and the back surface 72 are shapes having an isosceles triangular cross-section, but the shapes are not particularly limited, and may be for example, shapes having a triangular cross-section or a semicircular cross-section. In such a case, the lengths in the gradually changing directions of the first gradually changing portion 74a and the second gradually changing portion 74b may differ from each other. This is the same in the fourth embodiment and the fifth embodiment as well.

In the third embodiment, the respective vertices of the isosceles triangular cross-section of the front surface 71 and the back surface 72 in the gradually changing portion 74 may not be provided to locate on the straight line parallel to the front and back direction. That is, the respective vertices may be arranged offset. In such a case, another gradually changing portion, a third gradually changing portion, is formed between the first gradually changing portion 74a and the second gradually changing portion 74b. Therefore, a more different gradation effect can be exhibited. This is the same in the fourth embodiment and the fifth embodiment as well.

Moreover, in the third embodiment, the gradually changing front surface (741a, 741b) on the front surface 71 side of the gradually changing portion 74 is a gentler inclined surface than the gradually changing back surface (742a, 742b) on the back surface 72 side. In place thereof, the gradually changing back surface (742a, 742b) may be a gentler inclined surface than the gradually changing front surface (741a, 741b). This is the same in the fourth embodiment and the fifth embodiment as well.

In the fifth embodiment, the gradually changing portion 94 has the third gradually changing portion 94c and the first gradually changing portion 94a, and the fourth gradually changing portion 94d and the second gradually changing portion 94b formed to bilaterally symmetrical shapes with respect to each other with the maximum deviation portion 95 as the center. In place thereof, the gradually changing portion 94 may be configured from the first gradually changing portion 94a to the fourth gradually changing portion 94d all having different shapes. In such a case, the first gradually changing portion 94a to the fourth gradually changing portion 94d all have different gradually changing percentages. Therefore, according to the vehicle exterior decorating member of this case, four different gradation effects can be continuously exhibited at the gradually changing portion, which is advantageous in further enhancing the design characteristics. Furthermore, the gradually changing portion 94 may be configured to include four or more different gradually changing zones.

The vehicle exterior decorating member 1 of the present invention can be expressed as below. The reference numbers in the parentheses are reference numbers denoted in the second embodiment to the fifth embodiment.

[1] A vehicle exterior decorating member 1 including a base member 2 (6, 7, 8, 9) made of a colored translucent body having a front surface 21 (61, 71, 81, 91) facing an exterior of a vehicle and a back surface 22 (62, 72, 82, 92) facing the front surface back to back and including a surface having unevenness, and a light non-transmissive layer 3 formed on the back surface side of the base member, where the base member includes a general portion 23 (63, 73, 83, 93) where a thickness 23h (63h, 73h, 83h, 93h) is constant at greater than or equal to 2.5 mm and smaller than or equal to 4.0 mm, and a gradually changing portion 24 (64, 74, 84, 94) where a thickness gradually changes;

the gradually changing portion includes a maximum deviation portion 25 (65, 75, 85, 95) where difference in thickness between the general portion and the gradually changing portion becomes a maximum, and has at least one of following features <A> and <B>:

<A> Difference between a visible light transmissivity at the maximum deviation portion and a visible light transmissivity at the general portion is greater than or equal to 5%; and <B> Assuming an L value of the Lab color system defined in JIS Z 8729, a difference between an L value at the maximum deviation portion and an L value at the general portion is greater than or equal to two.

[2] The vehicle exterior decorating member described in [1], where the front surface 21 (61) is a flat surface.

[3] The vehicle exterior decorating member described in [1], where the front surface (71, 81, 91) is a surface having unevenness.

[4] The vehicle exterior decorating member described in any one of [1] to [3], where a difference in the thickness between the maximum deviation portion and the general portion is greater than or equal to 0.3 mm and smaller than or equal to 1.5 mm.

[5] The vehicle exterior decorating member described in any one of [1] to [4], where the gradually changing portion has a length in a gradually changing direction of greater than or equal to 10 mm.

[6] The vehicle exterior decorating member described in any one of [1] to [5], where a longitudinal length is greater than or equal to 500 mm.

[7] The vehicle exterior decorating member described in any one of [1] to [6], where the gradually changing portion is formed from a plurality of gradually changing portions in which a percentage, at which the thickness gradually changes, is different.

[8] The vehicle exterior decorating member described in any one of [1] to [7], where the gradually changing portion includes a first gradually changing portion 24a (64a, 74a, 84a, 94a) and a second gradually changing portion 24b (64b, 74b, 84b, 94b) continuing with each other and having the maximum deviation portion at a boundary; and the gradually changing direction of the first gradually changing portion is opposite to the gradually changing direction of the second gradually changing portion.

[9] The vehicle exterior decorating member described in [8], where the first gradually changing portion 24a (64a) has a longer length in a gradually changing direction than a length of the second gradually changing portion 24b (64b).

[10] A method for manufacturing the vehicle exterior decorating member 1 described in any one of [1] to [7], where a thickness of the gradually changing portion gradually becomes larger from the general portion toward the maximum deviation portion, the method including an injection molding step of injecting a flowable material into a molding die 4 including a first cavity 41 for molding the general portion and a second cavity 42 for molding the gradually changing portion 24, such that the flowable material flows toward a side in which a flow path cross-sectional area becomes larger in the second cavity 42.

[11] A method for manufacturing the vehicle exterior decorating member 1 described in [8] or [9], where a thickness of the gradually changing portion gradually becomes larger from the general portion toward the maximum deviation portion, the method including an injection molding step of injecting a flowable material into a molding die 4 including a first cavity 41 for molding the general portion and a second cavity 42 for molding the gradually changing portion, the second cavity having a first gradually-changing-portion molding portion 42a for molding the first gradually changing portion and a second gradually-changing-portion molding portion 42b for molding the second gradually changing portion, such that the flowable material flows from the first gradually-changing-portion molding portion 42a toward the second gradually-changing-portion molding portion 42b in the second cavity 42.

What is claimed is:

1. A vehicle exterior decorating member comprising:
   a base member made of a colored translucent body having a front surface facing an exterior of a vehicle and a back surface facing the front surface back to back and including a surface having unevenness; and
   a light non-transmissive layer formed on a back surface side of the base member, wherein
   the base member includes a general portion where a thickness is constant at greater than or equal to 2.5 mm and smaller than or equal to 4.0 mm, and a gradually changing portion where a thickness gradually changes, and
   the gradually changing portion includes a maximum deviation portion where a difference in thickness between the general portion and the gradually changing portion becomes a maximum, and has at least one of following features (A) and (B):
(A) Difference between a visible light transmissivity at the maximum deviation portion and a visible light transmissivity at the general portion is greater than or equal to 5%; and
(B) Assuming an L value of a Lab color system defined in JIS Z 8729, a difference between an L value at the maximum deviation portion and an L value at the general portion is greater than or equal to two.

2. The vehicle exterior decorating member according to claim 1, wherein the front surface is a flat surface.

3. The vehicle exterior decorating member according to claim 1, wherein the front surface is a surface having unevenness.

4. The vehicle exterior decorating member according to claim 1, wherein a difference in thickness between the maximum deviation portion and the general portion is greater than or equal to 0.3 mm and smaller than or equal to 1.0 mm.

5. The vehicle exterior decorating member according to claim 1, wherein the gradually changing portion has a length in a gradually changing direction of greater than or equal to 10 mm.

6. The vehicle exterior decorating member according to claim 1, wherein a longitudinal length is greater than or equal to 500 mm.

7. The vehicle exterior decorating member according to claim 1, wherein the gradually changing portion includes a plurality of gradually changing portions having different percentages, at which the thickness gradually changes, from each other.

8. The vehicle exterior decorating member according to claim 1, wherein
   the gradually changing portion includes a first gradually changing portion and a second gradually changing portion continuing with each other and having the maximum deviation portion at a boundary, and
   the gradually changing direction of the first gradually changing portion is opposite to the gradually changing direction of the second gradually changing portion.

9. The vehicle exterior decorating member according to claim 8, wherein the first gradually changing portion has a longer length in a gradually changing direction than a length of the second gradually changing portion.

10. A method for manufacturing the vehicle exterior decorating member according to claim 1, wherein
    a thickness of the gradually changing portion gradually becomes larger from the general portion toward the maximum deviation portion,
    the method comprising an injection molding step of injecting a flowable material into a molding die including a first cavity for molding the general portion and a second cavity for molding the gradually changing portion, such that the flowable material flows toward a side in which a flow path cross-sectional area becomes larger in the second cavity.

11. A method for manufacturing the vehicle exterior decorating member according to claim 8, wherein
    a thickness of the gradually changing portion gradually becomes larger from the general portion toward the maximum deviation portion,
    the method comprising an injection molding step of injecting a flowable material into a molding die including a first cavity for molding the general portion and a second cavity for molding the gradually changing portion, the second cavity having a first gradually-changing-portion molding portion for molding the first gradually changing portion and a second gradually-changing-portion molding portion for molding the second gradually changing portion, such that the flowable material flows from the first gradually-changing-portion molding portion toward the second gradually-changing-portion molding portion in the second cavity.

* * * * *